United States Patent
Kim et al.

(10) Patent No.: US 10,311,578 B1
(45) Date of Patent: Jun. 4, 2019

(54) LEARNING METHOD AND LEARNING DEVICE FOR SEGMENTING AN IMAGE HAVING ONE OR MORE LANES BY USING EMBEDDING LOSS TO SUPPORT COLLABORATION WITH HD MAPS REQUIRED TO SATISFY LEVEL 4 OF AUTONOMOUS VEHICLES AND SOFTMAX LOSS, AND TESTING METHOD AND TESTING DEVICE USING THE SAME

(71) Applicant: Stradvision, inc., Pohang (KR)

(72) Inventors: Kye-Hyeon Kim, Seoul (KR); Yongjoong Kim, Pohang-si (KR); Insu Kim, Pohang-si (KR); Hak-Kyoung Kim, Pohang-si (KR); Woonhyun Nam, Pohang-si (KR); SukHoon Boo, Anyang-si (KR); Myungchul Sung, Pohang-si (KR); Donghun Yeo, Pohang-si (KR); Wooju Ryu, Pohang-si (KR); Taewoong Jang, Seoul (KR); Kyungjoong Jeong, Pohang-si (KR); Hongmo Je, Pohang-si (KR); Hojin Cho, Pohang-si (KR)

(73) Assignee: Stradvision, Inc., Pohang (KR)

( * ) Notice: Subject to any disclaimer, the term of this patent is extended or adjusted under 35 U.S.C. 154(b) by 0 days.

(21) Appl. No.: 16/255,339

(22) Filed: Jan. 23, 2019

(51) Int. Cl.
 *G06K 7/14* (2006.01)
 *G06T 7/143* (2017.01)

(52) U.S. Cl.
 CPC .... *G06T 7/143* (2017.01); *G06T 2207/20081* (2013.01); *G06T 2207/20084* (2013.01); *G06T 2207/30256* (2013.01)

(58) Field of Classification Search
 CPC .......... G06T 7/143; G06T 2207/20081; G06T 2207/20084; G06T 2207/30256
 See application file for complete search history.

(56) References Cited

U.S. PATENT DOCUMENTS

| | | | | |
|---|---|---|---|---|
| 9,558,268 B2 * | 1/2017 | Tuzel | ..................... | G06F 16/353 |
| 9,623,905 B2 * | 4/2017 | Shashua | ................. | G01C 21/32 |
| 9,631,936 B2 * | 4/2017 | Shashua | ................. | G01C 21/32 |
| 9,633,282 B2 * | 4/2017 | Sharma | ................ | G06K 9/6256 |
| 9,665,100 B2 * | 5/2017 | Shashua | ................. | G01C 21/32 |
| 9,710,714 B2 * | 7/2017 | Chen | .................. | G06K 9/00798 |

(Continued)

*Primary Examiner* — Manav Seth
(74) *Attorney, Agent, or Firm* — Xsensus LLP

(57) ABSTRACT

A learning method for segmenting an image having one or more lanes is provided to be used for supporting collaboration with HD maps required to satisfy level 4 of autonomous vehicles. The learning method includes steps of: a learning device instructing a CNN module (a) to apply convolution operations to the image, thereby generating a feature map, and apply deconvolution operations thereto, thereby generating segmentation scores of each of pixels on the image; (b) to apply Softmax operations to the segmentation scores, thereby generating Softmax scores; and (c) to (I) apply multinomial logistic loss operations and pixel embedding operations to the Softmax scores, thereby generating Softmax losses and embedding losses, where the embedding losses is used to increase inter-lane differences among averages of the segmentation scores and decrease intra-lane variances among the segmentation scores, in learning parameters of the CNN module, and (II) backpropagate the Softmax and the embedding losses.

8 Claims, 5 Drawing Sheets

(56) References Cited

U.S. PATENT DOCUMENTS

| | | | |
|---|---|---|---|
| 9,767,381 B2* | 9/2017 | Rodriguez-Serrano | G06F 16/54 |
| 9,773,196 B2* | 9/2017 | Sachs | G06K 9/66 |
| 9,830,529 B2* | 11/2017 | Jetley | G06K 9/4671 |
| 9,916,679 B2* | 3/2018 | Flynn | G06T 15/20 |
| 9,947,102 B2* | 4/2018 | Xu | G06K 9/6269 |
| 9,953,236 B1* | 4/2018 | Huang | G06K 9/34 |
| 9,965,705 B2* | 5/2018 | Chen | G06N 3/0454 |
| 2016/0117587 A1* | 4/2016 | Yan | G06N 3/08 706/20 |
| 2017/0308770 A1* | 10/2017 | Jetley | G06K 9/4671 |
| 2017/0336792 A1* | 11/2017 | Gdalyahu | G01C 21/32 |
| 2017/0364082 A1* | 12/2017 | Taieb | G01C 21/32 |
| 2018/0157963 A1* | 6/2018 | Salti | G06N 3/0445 |
| 2018/0204111 A1* | 7/2018 | Zadeh | G06N 3/0436 |
| 2018/0217600 A1* | 8/2018 | Shashua | G01C 21/32 |

* cited by examiner

LEARNING METHOD AND LEARNING DEVICE FOR SEGMENTING AN IMAGE HAVING ONE OR MORE LANES BY USING EMBEDDING LOSS TO SUPPORT COLLABORATION WITH HD MAPS REQUIRED TO SATISFY LEVEL 4 OF AUTONOMOUS VEHICLES AND SOFTMAX LOSS, AND TESTING METHOD AND TESTING DEVICE USING THE SAME

FIELD OF THE DISCLOSURE

The present disclosure relates to a learning method for segmenting an input image having one or more lanes to be used for supporting collaboration with HD maps required to satisfy level 4 of autonomous vehicles; and more particularly, to the learning method for segmenting the input image having the lanes including steps of: (a) if the input image is acquired, instructing a convolutional neural network (CNN) module to apply at least one convolution operation to the input image to thereby generate a feature map and then apply at least one deconvolution operation to the feature map to thereby generate each of segmentation scores of each of pixels on the input image; (b) instructing the CNN module to apply at least one Softmax operation to each of the segmentation scores to thereby generate each of Softmax scores; and (c) instructing the CNN module to (I) (i) apply at least one multinomial logistic loss operation to each of the Softmax scores to thereby generate each of Softmax losses and (ii) apply at least one pixel embedding operation to each of the Softmax scores to thereby generate each of embedding losses which causes a learning of the CNN module to increase each of inter-lane differences among respective averages of the segmentation scores of the respective lanes and decrease each of intra-lane variances among the segmentation scores of the respective lanes, and then (II) learn at least one parameter of the CNN module through backpropagation by using each of the Softmax losses and each of the embedding losses, and a learning device, a testing method and a testing device using the same.

BACKGROUND OF THE DISCLOSURE

Deep Convolution Neural Networks (Deep CNNs) are the heart of the remarkable development in deep learning. CNNs have already been used in the 90's to solve the problem of character recognition, but their use has become as widespread as it is now thanks to recent research. These deep CNNs won the 2012 ImageNet image classification tournament, crushing other competitors. Then, the convolution neural network became a very useful tool in the field of the machine learning.

Meanwhile, image segmentation is a method for receiving an input image such as a training image or a test image and generating a label image as an output image. Recently as the deep learning technology becomes widespread, the deep learning is frequently used for the segmentation.

When the segmentation is performed, if a distribution of the number of pixels is uneven in each cluster on the image, a portion with a small number of pixels is often blurred. A representative example of the uneven distribution of the number of pixels is an image taken by an autonomous vehicle system. In this case, if a specific lane is discontinuous or exists in a remote area in the image, the number of pixels of the specific lane is small, and thus there is a problem that the specific lane where the number of pixels is small is erroneously judged as not a lane at the time of the segmentation.

SUMMARY OF THE DISCLOSURE

It is an object of the present disclosure to solve all the aforementioned problems.

It is another object of the present disclosure to allow a portion with only a small number of pixels to be displayed as a thick color on a segmentation result, to thereby allow segmentation scores capable of distinguishing different lanes more easily to be outputted, by backpropagating a Softmax loss and an embedding loss.

In accordance with one aspect of the present disclosure, there is provided a learning method for segmenting an input image having one or more lanes, including steps of: (a) a learning device, if the input image is acquired, instructing a convolutional neural network (CNN) module to apply at least one convolution operation to the input image to thereby generate a feature map and then apply at least one deconvolution operation to the feature map to thereby generate each of segmentation scores of each of pixels on the input image; (b) the learning device instructing the CNN module to apply at least one Softmax operation to each of the segmentation scores to thereby generate each of Softmax scores; and (c) the learning device instructing the CNN module to (I) (i) apply at least one multinomial logistic loss operation to each of the Softmax scores to thereby generate each of Softmax losses and (ii) apply at least one pixel embedding operation to each of the Softmax scores to thereby generate each of embedding losses which causes a learning of the CNN module to increase each of inter-lane differences among respective averages of the segmentation scores of the respective lanes and decrease each of intra-lane variances among the segmentation scores of the respective lanes, and then (II) learn at least one parameter of the CNN module through backpropagation by using each of the Softmax losses and each of the embedding losses.

As one example, each of the embedding losses is calculated by using a formula:

$$\frac{\frac{1}{NC}\sum_{c=1}^{NC}\frac{1}{NC_c}\sum_{p=1}^{NC_c}\max(0,(\|x_p-\mu_c\|-\max Dev)^2)+}{\frac{1}{NCombi}\sum_{c_1\in C, c_2\in C}\max(0,(\min Dist-\|\mu_{c_1}-\mu_{c_2}\|)^2)}{\min Dist^2},$$

wherein, assuming that the input image includes a plurality of clusters having the lanes and one or more background parts, NC denotes the number of the clusters including the lanes and the background parts on the input image, $NC_c$ denotes the number of pixels in each of the clusters, $\mu_c$ denotes each average of Softmax scores corresponding to respective pixels included in each of the clusters, maxDev denotes a maximum value among variances calculated by referring to the Softmax scores and the $\mu_c$ corresponding to the respective pixels, and minDist denotes a minimum value among differences between $\mu_c$ s corresponding to different clusters.

As one example, each of the multinomial logistic losses is calculated by using an equation:

$$\text{softmax\_loss} = -\frac{1}{s}\sum_{i}^{s} \log(P(i)^l),$$

wherein s denotes the number of the pixels included in the one input image, l denotes a one-hot-encoding vector indicating to which cluster an i-th pixel belongs on its corresponding ground truth (GT) label, and P(i) denotes each of Softmax scores corresponding to each of the pixels.

In accordance with another aspect of the present disclosure, there is provided a testing method for segmenting a test image having one or more lanes, including steps of: (a) on condition that a learning device (1) has instructed a convolutional neural network (CNN) module to apply at least one convolution operation to a training image to thereby generate a feature map for training and then apply at least one deconvolution operation to the feature map for training to thereby generate each of segmentation scores for training of each of pixels on the training image; (2) has instructed the CNN module to apply at least one Softmax operation to each of the segmentation scores for training to thereby generate each of Softmax scores for training; and (3) has instructed the CNN module to (I) (i) apply at least one multinomial logistic loss operation to each of the Softmax scores for training to thereby generate each of Softmax losses and (ii) apply at least one pixel embedding operation to each of the Softmax scores for training to thereby generate each of embedding losses which causes a learning of the CNN module to increase each of inter-lane differences among respective averages of the segmentation scores for training of the respective lanes and decrease each of intra-lane variances among the segmentation scores for training of the respective lanes, and then (II) learn at least one parameter of the CNN module through backpropagation by using each of the Softmax losses and each of the embedding losses, a testing device, if the test image is acquired, instructing the CNN module to apply the convolution operation to the test image to thereby generate a feature map for testing and then apply the deconvolution operation to the feature map for testing to thereby generate each of segmentation scores for testing of each of pixels on the test image; and (b) the testing device instructing the CNN module to apply the Softmax operation to each of the segmentation scores for testing to thereby generate each of Softmax scores for testing.

In accordance with still another aspect of the present disclosure, there is provided a learning device for segmenting an input image having one or more lanes, including: at least one memory that stores instructions; and at least one processor configured to execute the instructions to: perform processes of (I) instructing a convolutional neural network (CNN) module to apply at least one convolution operation to the input image to thereby generate a feature map and then apply at least one deconvolution operation to the feature map to thereby generate each of segmentation scores of each of pixels on the input image, (II) instructing the CNN module to apply at least one Softmax operation to each of the segmentation scores to thereby generate each of Softmax scores, and (III) instructing the CNN module to (1) (i) apply at least one multinomial logistic loss operation to each of the Softmax scores to thereby generate each of Softmax losses and (ii) apply at least one pixel embedding operation to each of the Softmax scores to thereby generate each of embedding losses which causes a learning of the CNN module to increase each of inter-lane differences among respective averages of the segmentation scores of the respective lanes and decrease each of intra-lane variances among the segmentation scores of the respective lanes, and then (2) learn at least one parameter of the CNN module through backpropagation by using each of the Softmax losses and each of the embedding losses.

As one example, each of the embedding losses is calculated by using a formula:

$$\frac{\dfrac{1}{NC}\sum_{c=1}^{NC}\dfrac{1}{NC_c}\sum_{p=1}^{NC_c}\max(0, (\|x_p - \mu_c\| - \max Dev)^2) +}{\dfrac{1}{NCombi}\sum_{c_1 \in C, c_2 \in C}\max(0, (\min Dist - \|\mu_{c_1} - \mu_{c_2}\|)^2)}{\min Dist^2},$$

wherein, assuming that the input image includes a plurality of clusters having the lanes and one or more background parts, NC denotes the number of the clusters including the lanes and the background parts on the input image, $NC_c$ denotes the number of pixels in each of the clusters, $\mu_c$ denotes each average of Softmax scores corresponding to respective pixels included in each of the clusters, maxDev denotes a maximum value among variances calculated by referring to the Softmax scores and the $\mu_c$ corresponding to the respective pixels, and minDist denotes a minimum value among differences between $\mu_c$ s corresponding to different clusters.

As one example, each of the multinomial logistic losses is calculated by using an equation:

$$\text{softmax\_loss} = -\frac{1}{s}\sum_{i}^{s} \log(P(i)^l),$$

wherein s denotes the number of the pixels included in the one input image, l denotes a one-hot-encoding vector indicating to which cluster an i-th pixel belongs on its corresponding ground truth (GT) label, and P(i) denotes each of Softmax scores corresponding to each of the pixels.

In accordance with still yet another aspect of the present disclosure, there is provided a testing method for segmenting a test image having one or more lanes, including: at least one memory that stores instructions; and at least one processor, on condition that a learning device (1) has instructed a convolutional neural network (CNN) module to apply at least one convolution operation to a training image to thereby generate a feature map for training and then apply at least one deconvolution operation to the feature map for training to thereby generate each of segmentation scores for training of each of pixels on the training image, (2) has instructed the CNN module to apply at least one Softmax operation to each of the segmentation scores for training to thereby generate each of Softmax scores for training, and (3) has instructed the CNN module to (3-1) (i) apply at least one multinomial logistic loss operation to each of the Softmax scores for training to thereby generate each of Softmax losses and (ii) apply at least one pixel embedding operation to each of the Softmax scores for training to thereby generate each of embedding losses which causes a learning of the CNN module to increase each of inter-lane differences among respective averages of the segmentation scores for training of the respective lanes and decrease each of intra-lane variances among the segmentation scores for training of the respective lanes, and then (3-2) learn at least one parameter of the CNN module through backpropagation by using each of the Softmax losses and each of the embedding losses; configured to execute the instructions to: perform processes of (I) instructing the CNN module to apply the convolution operation to the test image to thereby generate a feature map for testing and then apply the deconvolution operation to the feature map for testing to thereby generate each of segmentation scores for testing of each of pixels on the test image, and (II) instructing the CNN module to apply the Softmax operation to each of the segmentation scores for testing to thereby generate each of Softmax scores for testing.

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings, in which.

DETAILED DESCRIPTION OF THE PREFERRED EMBODIMENTS

Figure 1:
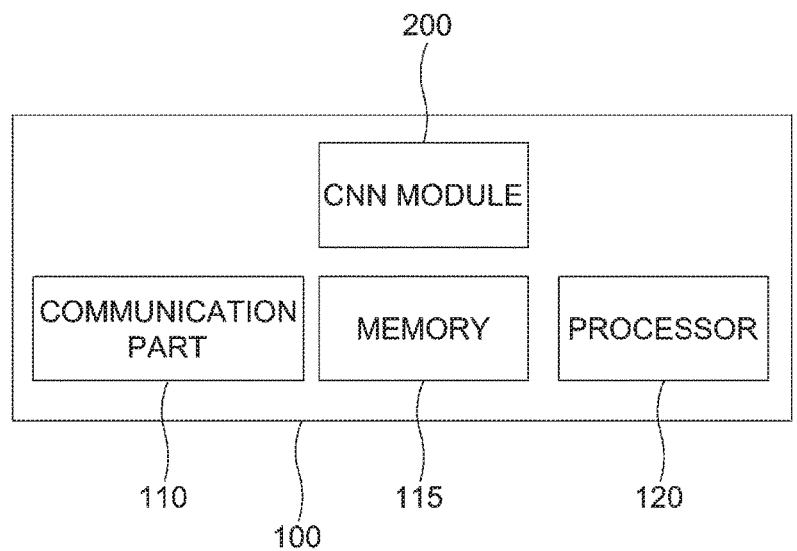
FIG. 1 is a drawing illustrating a learning device in accordance with the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits, and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to the present disclosure to be carried out easily, the example embodiments of the present disclosure by referring to attached diagrams will be explained in detail as shown below.

FIG. 1 is a drawing illustrating a learning device in accordance with the present disclosure.

Referring to FIG. 1, the learning device 100 may include a convolutional neural network (CNN) module 200. Further, various data are received or transmitted by a communication part 110 and various processes of the CNN module 200 may be performed by a processor 120. However, in FIG. 1, specific connection among the communication part 110, the processor 120 and the CNN module 200 is omitted. In addition, the learning device may further include a memory 115 capable of storing computer readable instructions for performing following processes. As one example, the processor, the memory, a medium, etc. may be integrated with an integrated processor.

Figure 2:
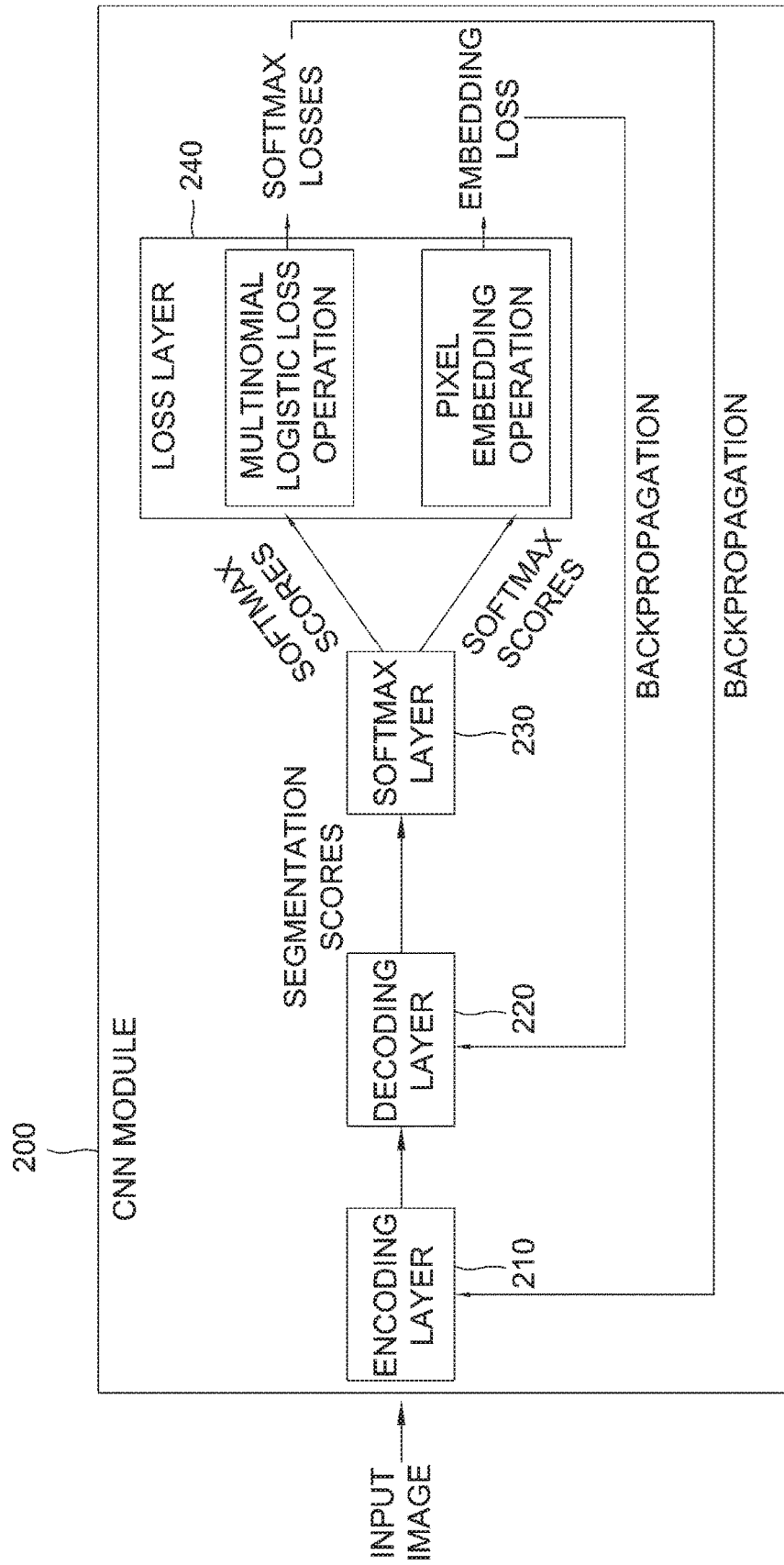
FIG. 2 is a drawing illustrating a process of learning a convolutional neural network (CNN) by backpropagating embedding loss values and Softmax loss values in accordance with an example embodiment of the present disclosure.

FIG. 2 is a drawing illustrating a process of learning a convolutional neural network (CNN) by backpropagating embedding loss values and Softmax loss values in accordance with an example embodiment of the present disclosure.

Referring to FIG. 2, if an input image is obtained through the communication part 110, the CNN module 200 may output segmentation scores for the input image through predetermined neural network operations.

Specifically, the CNN module 200 may include an encoding layer 210 and a decoding layer 220. The encoding layer 210 may apply at least one convolution operation to the input image to thereby generate at least one encoded feature map, and the decoding layer 220 may apply at least one deconvolution operation to a specific encoded feature map outputted from the encoding layer 210 to thereby generate at least one decoded feature map. The specific feature map may be an encoded feature map which is finally outputted from the encoding layer 210, but the present disclosure is not limited to this example.

The CNN module 200 may output a specific decoded feature map as including each of the segmentation scores or may apply at least one convolution operation to the specific decoded feature map to thereby output the result as including each of the segmentation scores. Further, the specific decoded feature map may be a decoded feature map which is finally outputted from the decoding layer 220, but the present disclosure is not limited to this example.

The learning device 100 may instruct the CNN module to apply at least one Softmax operation to each of the outputted segmentation scores in a Softmax layer 230 to thereby generate each of normalized Softmax scores such that a range of each value of the segmentation scores is from 0 to 1.

If each of the Softmax scores is generated in the Softmax layer 230, the learning device 100 instructs the CNN module 200 to (i) apply at least one multinomial logistic loss operation to each of the Softmax scores to thereby generate each of Softmax losses, where the multinomial logistic loss operation is an operation for outputting the Softmax losses by referring to the Softmax scores and their corresponding GTs and (ii) apply at least one pixel embedding operation to each of the Softmax scores to thereby generate each of embedding losses, where each of the embedding losses is used to increase each of inter-lane differences among respective averages of the segmentation scores of the respective lanes and decrease each of intra-lane variances among the segmentation scores of the respective lanes during the learning process of the CNN module. Hereinafter, the pixel embedding operation and the multinomial logistic loss operation will be described in detail.

As explained above, the pixel embedding operation generates each of the embedding losses to be used for the learning of the CNN module capable of increasing each of inter-lane differences among respective averages of the segmentation scores of the respective lanes and decreasing each of intra-lane variances among the segmentation scores of the respective lanes.

Each of the embedding losses is calculated by using a formula:

$$\frac{\frac{1}{NC}\sum_{c=1}^{NC}\frac{1}{NC_c}\sum_{p=1}^{NC_c}\max(0,(\|x_p-\mu_c\|-\max Dev)^2)+}{\frac{1}{NC\times(NC-1)}\sum_{c_1\in C,c_2\in C}\max(0,(\min Dist-\|\mu_{c_1}-\mu_{c_2}\|)^2)}{\min Dist^2}$$

Assuming that the input image includes a plurality of clusters having the lanes and one or more background parts, NC denotes the number of the clusters including the lanes and the background parts on the input image, $NC_c$ denotes the number of pixels in each of the clusters, $\mu_c$ denotes each average of Softmax scores corresponding to respective pixels included in each of the clusters, maxDev denotes a maximum value among variances calculated by referring to the Softmax scores and the $\mu_c$ corresponding to the respective pixels, and minDist denotes a minimum value among differences between $\mu_c$ s corresponding to different clusters.

In the above formula, $$\frac{1}{NC}\sum_{c=1}^{NC}\frac{1}{NC_c}\sum_{p=1}^{NC_c}\max(0,(\|x_p-\mu_c\|-\max Dev)^2)$$

portion means the losses about the variances, and $$\frac{1}{NC\times(NC-1)}\sum_{c_1\in C,c_2\in C}\max(0,(\min Dist-\|\mu_{c_1}-\mu_{c_2}\|)^2)$$

portion means losses about the averages. The $minDist^2$ of the denominator is used for normalization. Herein, $minDist^2$ is used instead of minDist because the embedding losses become too large if the numerator is divided by the minsDist, and thus it is not balanced with the Softmax losses. The embedding losses may reduce the variances between the segmentation scores corresponding to the pixels within the same lane to values less than maxDev and increase the differences between the averages of the pixels within different lanes to values equal to or greater than minDist. The embedding losses of the present disclosure can be operated through the above formula, but the present disclosure is not limited to this example.

Next, the multinomial logistic loss operation is an operation capable of outputting the Softmax losses by referring to the Softmax scores and their corresponding GTs.

Each of the multinomial logistic losses is calculated by using an equation:

$$\text{softmax\_loss}=-\frac{1}{S}\sum_{i}^{s}\log(P(i)^l)$$

Herein, s denotes the number of the pixels included in the one input image, l denotes a one-hot-encoding vector indicating to which cluster an i-th pixel belongs on its corresponding ground truth (GT) label, and P(i) denotes each of the Softmax scores corresponding to each of the pixels.

Herein, each of the Softmax scores indicates the cluster to which each pixel belongs through the largest element value within the vector, and vector dot product calculation between (i) l indicating one hot encoding vector and (ii) a vector which is a logarithm of the Softmax scores is performed. For example, if a Softmax score of a specific pixel included in a second lane is expressed as (0.1, 0.8, 0.1) and l vector is expressed as (0, 1, 0), a loss value of the specific pixel is calculated as $-1\times\log(0.8)$. Then each of the loss values calculated as such per pixel is added and then divided by the number of the pixels, to thereby generate each of the Softmax losses. Each of the Softmax losses can be calculated through the above-described equation, but the present disclosure is not limited to this example.

Each of the Softmax losses and each of the embedding losses, which are outputted from the loss layer 240, may be used for learning at least one parameter of the CNN module through the backpropagation.

Hereinafter, processes performed by the testing device, on condition that the learning process of the CNN module 200 has been completed, will be described by referring to FIG. 2.

Referring to FIG. 2, after receiving the input image, the CNN module 200 generates each of the segmentation scores as an output of the decoding layer 220, and at least one Softmax operation is applied to each of the segmentation scores at the Softmax layer 230. In the testing process, since the parameters of the layers have already been learned, the loss calculation process and the backpropagation process are omitted.

Figure 3:
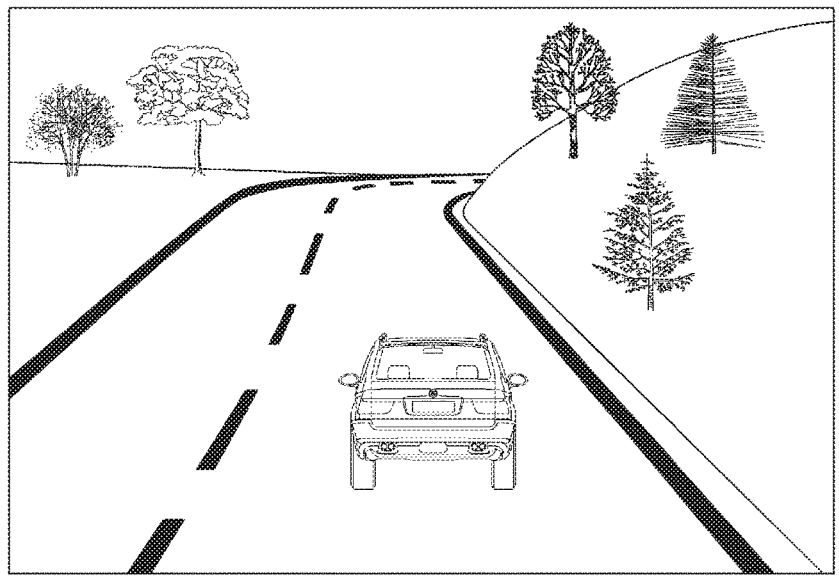
FIG. 3 is a drawing illustrating a case in which the number of pixels within a cluster is uneven in accordance with the present disclosure.

FIG. 3 illustrates an example of an image in which each variance of the number of pixels in each of lanes is equal to or greater than a specific threshold depending on each location of each of the lanes.

Referring to FIG. 3, it is seen that the number of pixels in each of the lanes on the image of FIG. 3 is uneven according to the location of the pixels. Namely, pixels of each of the lanes located at a short distance look thick because there are a lot of pixels in each of the lanes, but pixels of each of the lanes located at a long distance look thin because there are only a few pixels in each of the lanes. Thus, the variances of the number of pixels of the lanes become large. Accordingly, if at least one of the variances is equal to or greater than the specific threshold, the segmentation method in accordance with the present disclosure can be adopted to achieve a significant effect of detecting the lanes more accurately.

Figure 4A:
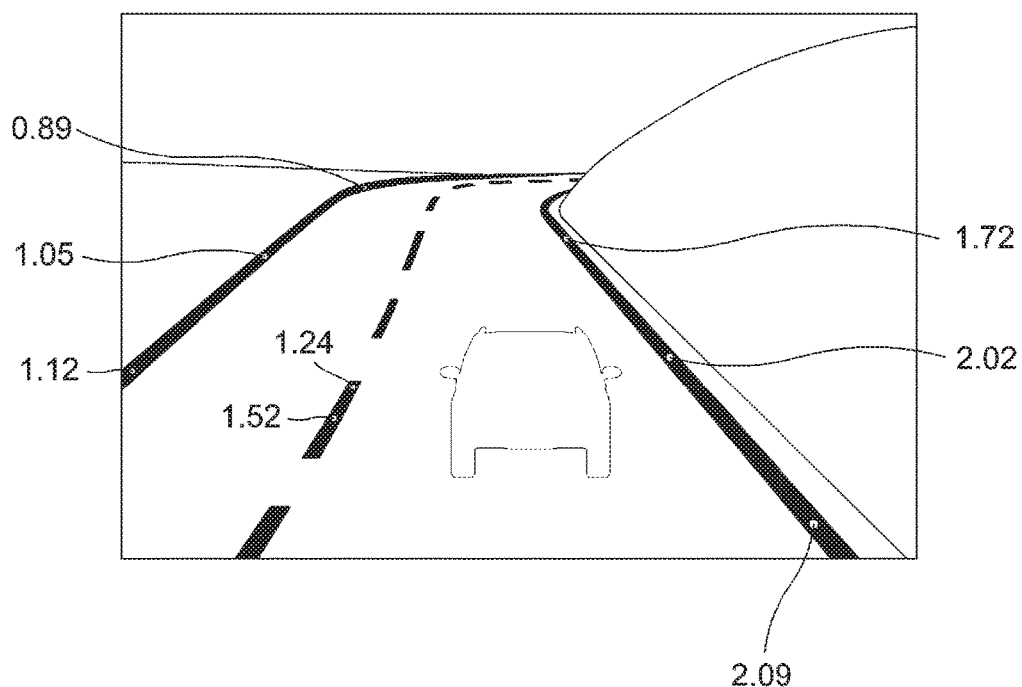
FIG. 4A is a drawing illustrating segmentation scores when the image of FIG. 3 is segmented according to a conventional art.
Figure 4B:
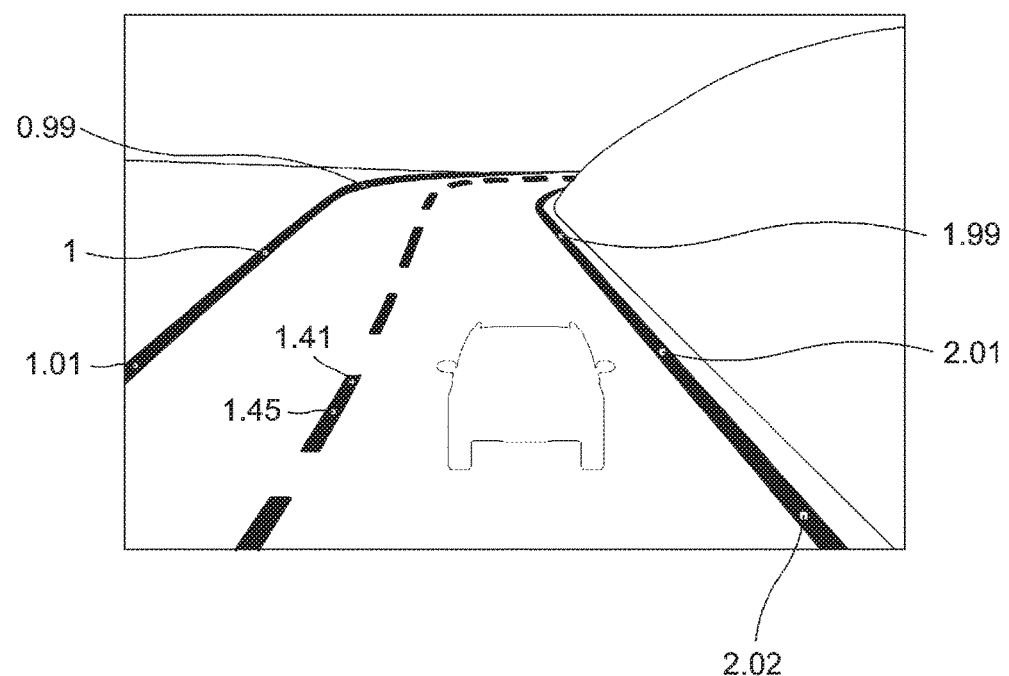
FIG. 4B is a drawing illustrating segmentation scores when the image of FIG. 3 is segmented in accordance with an example embodiment of the present disclosure.

FIG. 4A is a drawing illustrating segmentation scores when the image of FIG. 3 is segmented according to a conventional art and FIG. 4B is a drawing illustrating segmentation scores when the image of FIG. 3 is segmented in accordance with an example embodiment of the present disclosure.

Referring to FIG. 4A, a segmentation score of a specific region having a relatively small amount of lane pixels may be significantly different from a segmentation score of a certain region having a relatively large amount of lane pixels. Herein, the specific region may include lane pixels located at a long distance or lane pixels with a relatively small amount thereof for some other reasons. Further, the certain region may include lane pixels located at a short distance or lane pixels with a relatively large amount thereof for some other reasons. For example, referring to a leftmost lane of FIG. 4A, a segmentation score of an uppermost portion thereof with a small number of pixels is 0.89, but segmentation scores of a middle portion and a lowermost portion thereof are 1.05 and 1.12, respectively. Thus, differences among the segmentation scores of the leftmost lane are significant. In the same manner, referring to a rightmost lane of FIG. 4A, a segmentation score of an uppermost portion thereof is 1.72 while segmentation scores of a middle portion and a lowermost portion thereof are 2.02 and 2.09, respectively.

Since there are a lot of pixels of a road, not pixels of a lane, when there are only a few lane pixels in the specific region, the CNN module 200 are less likely to determine pixels in the specific region as a lane. Thus, the specific region with only a few lane pixels may be displayed blurredly when the segmentation result is outputted.

In contrast, as shown in FIG. 4B, since the CNN device has been learned through backpropagation, segmentation scores of the uppermost portion, the middle portion and the lowermost portion of the leftmost lane may be calculated similarly with each other. Likewise, segmentation scores of the upper portion and the lower portion of the middle lane may be calculated similarly with each other. Further, segmentation scores of the uppermost portion, the middle portion and the lowermost portion of the rightmost lane may be calculated similarly with each other.

It may be easily understood by one of ordinary skill in the art that transmission and reception of data can be performed by the communication parts of the learning device and/or the testing device, and the convolution operation, deconvolution operation, and loss value operation can be performed mainly by the processor of the learning device and/or the testing device, but the present disclosure is not limited to these examples. In addition, memories capable of storing computer readable instructions for performing the above-described processes may be included in the learning device and/or the testing device. As one example, the processor, the memory, a medium, etc. may be integrated with an integrated processor.

The present disclosure has an effect of obtaining optimized segmentation result by allowing segmentation scores between pixels belonging to the same lane to have a smaller difference and allowing segmentation scores between pixels on different lanes to have a larger difference.

The learning method and the testing method may be used for supporting collaboration with HD maps required to satisfy level 4 of autonomous vehicles.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A learning method for segmenting an input image having one or more lanes, comprising steps of:
    (a) a learning device, if the input image is acquired, instructing a convolutional neural network (CNN) module to apply at least one convolution operation to the input image to thereby generate a feature map and then apply at least one deconvolution operation to the feature map to thereby generate each of segmentation scores of each of pixels on the input image;
    (b) the learning device instructing the CNN module to apply at least one Softmax operation to each of the segmentation scores to thereby generate each of Softmax scores; and
    (c) the learning device instructing the CNN module to (I) (i) apply at least one multinomial logistic loss operation to each of the Softmax scores to thereby generate each of Softmax losses and (ii) apply at least one pixel embedding operation to each of the Softmax scores to thereby generate each of embedding losses which causes a learning of the CNN module to increase each of inter-lane differences among respective averages of the segmentation scores of the respective lanes and decrease each of intra-lane variances among the segmentation scores of the respective lanes, and then (II) learn at least one parameter of the CNN module through backpropagation by using each of the Softmax losses and each of the embedding losses.

2. The learning method of claim 1, wherein each of the embedding losses is calculated by using a formula:

$$\frac{\dfrac{1}{NC}\sum_{c=1}^{NC}\dfrac{1}{NC_c}\sum_{p=1}^{NC_c}\max(0,(\|x_p-\mu_c\|-\max Dev)^2)+}{\dfrac{1}{NCombi}\sum_{c_1\in C, c_2\in C}\max(0,(\min Dist-\|\mu_{c_1}-\mu_{c_2}\|)^2)}{\min Dist^2},$$

and wherein, assuming that the input image includes a plurality of clusters having the lanes and one or more background parts, NC denotes the number of the clusters including the lanes and the background parts on the input image, $NC_c$ denotes the number of pixels in each of the clusters, $\mu_c$ denotes each average of Softmax scores corresponding to respective pixels included in each of the clusters, maxDev denotes a maximum value among variances calculated by referring to the Softmax scores and the $\mu_c$ corresponding to the respective pixels, and minDist denotes a minimum value among differences between $\mu_c$ s corresponding to different clusters.

3. The learning method of claim 1, wherein each of the multinomial logistic losses is calculated by using an equation:

$$\text{softmax\_loss} = -\frac{1}{s}\sum_{i}^{s}\log(P(i)^l),$$

and wherein s denotes the number of the pixels included in the one input image, l denotes a one-hot-encoding vector indicating to which cluster an i-th pixel belongs on its corresponding ground truth (GT) label, and P(i) denotes each of Softmax scores corresponding to each of the pixels.

4. A testing method for segmenting a test image having one or more lanes, comprising steps of:

(a) on condition that a learning device (1) has instructed a convolutional neural network (CNN) module to apply at least one convolution operation to a training image to thereby generate a feature map for training and then apply at least one deconvolution operation to the feature map for training to thereby generate each of segmentation scores for training of each of pixels on the training image; (2) has instructed the CNN module to apply at least one Softmax operation to each of the segmentation scores for training to thereby generate each of Softmax scores for training; and (3) has instructed the CNN module to (I) (i) apply at least one multinomial logistic loss operation to each of the Softmax scores for training to thereby generate each of Softmax losses and (ii) apply at least one pixel embedding operation to each of the Softmax scores for training to thereby generate each of embedding losses which causes a learning of the CNN module to increase each of inter-lane differences among respective averages of the segmentation scores for training of the respective lanes and decrease each of intra-lane variances among the segmentation scores for training of the respective lanes, and then (II) learn at least one parameter of the CNN module through backpropagation by using each of the Softmax losses and each of the embedding losses, a testing device, if the test image is acquired, instructing the CNN module to apply the convolution operation to the test image to thereby generate a feature map for testing and then apply the deconvolution operation to the feature map for testing to thereby generate each of segmentation scores for testing of each of pixels on the test image; and (b) the testing device instructing the CNN module to apply the Softmax operation to each of the segmentation scores for testing to thereby generate each of Softmax scores for testing.

5. A learning device for segmenting an input image having one or more lanes, comprising:

at least one memory that stores instructions; and at least one processor configured to execute the instructions to: perform processes of (I) instructing a convolutional neural network (CNN) module to apply at least one convolution operation to the input image to thereby generate a feature map and then apply at least one deconvolution operation to the feature map to thereby generate each of segmentation scores of each of pixels on the input image, (II) instructing the CNN module to apply at least one Softmax operation to each of the segmentation scores to thereby generate each of Softmax scores, and (III) instructing the CNN module to (1) (i) apply at least one multinomial logistic loss operation to each of the Softmax scores to thereby generate each of Softmax losses and (ii) apply at least one pixel embedding operation to each of the Softmax scores to thereby generate each of embedding losses which causes a learning of the CNN module to increase each of inter-lane differences among respective averages of the segmentation scores of the respective lanes and decrease each of intra-lane variances among the segmentation scores of the respective lanes, and then (2) learn at least one parameter of the CNN module through backpropagation by using each of the Softmax losses and each of the embedding losses.

6. The learning device of claim 5, wherein each of the embedding losses is calculated by using a formula:

$$\frac{\dfrac{1}{NC}\sum_{c=1}^{NC}\dfrac{1}{NC_c}\sum_{p=1}^{NC_c}\max(0,(\|x_p-\mu_c\|-\max Dev)^2)+}{\dfrac{1}{NCombi}\sum_{c_1\in C, c_2\in C}\max(0,(\min Dist-\|\mu_{c_1}-\mu_{c_2}\|)^2)}{\min Dist^2},$$

and wherein, assuming that the input image includes a plurality of clusters having the lanes and one or more background parts, NC denotes the number of the clusters including the lanes and the background parts on the input image, $NC_c$ denotes the number of pixels in each of the clusters, $\mu_c$ denotes each average of Softmax scores corresponding to respective pixels included in each of the clusters, maxDev denotes a maximum value among variances calculated by referring to the Softmax scores and the $\mu_c$ corresponding to the respective pixels, and minDist denotes a minimum value among differences between $\mu_c$ s corresponding to different clusters.

7. The learning device of claim 5, wherein each of the multinomial logistic losses is calculated by using an equation:

$$\text{softmax\_loss} = -\frac{1}{s}\sum_{i}^{s} \log(P(i)^l),$$

and
wherein s denotes the number of the pixels included in the one input image, l denotes a one-hot-encoding vector indicating to which cluster an i-th pixel belongs on its corresponding ground truth (GT) label, and P(i) denotes each of Softmax scores corresponding to each of the pixels.

8. A testing method for segmenting a test image having one or more lanes, comprising:
at least one memory that stores instructions; and
at least one processor, on condition that a learning device (1) has instructed a convolutional neural network (CNN) module to apply at least one convolution operation to a training image to thereby generate a feature map for training and then apply at least one deconvolution operation to the feature map for training to thereby generate each of segmentation scores for training of each of pixels on the training image, (2) has instructed the CNN module to apply at least one Softmax operation to each of the segmentation scores for training to thereby generate each of Softmax scores for training, and (3) has instructed the CNN module to (3-1) (i) apply at least one multinomial logistic loss operation to each of the Softmax scores for training to thereby generate each of Softmax losses and (ii) apply at least one pixel embedding operation to each of the Softmax scores for training to thereby generate each of embedding losses which causes a learning of the CNN module to increase each of inter-lane differences among respective averages of the segmentation scores for training of the respective lanes and decrease each of intra-lane variances among the segmentation scores for training of the respective lanes, and then (3-2) learn at least one parameter of the CNN module through back-propagation by using each of the Softmax losses and each of the embedding losses; configured to execute the instructions to: perform processes of (I) instructing the CNN module to apply the convolution operation to the test image to thereby generate a feature map for testing and then apply the deconvolution operation to the feature map for testing to thereby generate each of segmentation scores for testing of each of pixels on the test image, and (II) instructing the CNN module to apply the Softmax operation to each of the segmentation scores for testing to thereby generate each of Softmax scores for testing.

* * * * *